ically being treated in every direction are compared in
United States Patent [19]

Schulz

[11] Patent Number: 4,498,104
[45] Date of Patent: Feb. 5, 1985

[54] METHOD AND APPARATUS FOR CONCEALING ERRORS IN A DIGITAL TELEVISION SIGNAL

[75] Inventor: Axel Schulz, Bickenbach, Fed. Rep. of Germany

[73] Assignee: Robert Bosch GmbH, Stuttgart, Fed. Rep. of Germany

[21] Appl. No.: 382,385

[22] Filed: May 26, 1982

[30] Foreign Application Priority Data

May 30, 1981 [DE] Fed. Rep. of Germany ....... 3121599

[51] Int. Cl.³ .............................................. H04N 5/14
[52] U.S. Cl. ................................. 358/160; 358/21 R; 358/163; 358/314; 358/167; 382/54; 382/52
[58] Field of Search ............. 358/160, 163, 166, 21 R, 358/37, 314, 336, 167; 382/52, 54; 360/38.1

[56] References Cited

U.S. PATENT DOCUMENTS

| | | | |
|---|---|---|---|
| 2,921,124 | 1/1960 | Graham | 358/138 |
| 3,925,811 | 12/1975 | Kenney | 358/314 |
| 4,232,340 | 11/1980 | Fuhrer | 358/314 |
| 4,368,483 | 1/1983 | Liu | 358/166 |
| 4,389,672 | 6/1983 | Bowen et al. | 358/160 |

OTHER PUBLICATIONS

Journal of the SMPTE; "Digital Television Image Enhancement", by John Rossi, vol. 84, pp. 545–551, (1975).
"Digital Techniques for Reducing Television Noise" by John P. Rossi, *SMPTE Journal*, Mar. 1978, vol. 87, pp. 134–140.

Primary Examiner—John C. Martin
Assistant Examiner—Michael D. Parker
Attorney, Agent, or Firm—Frishauf, Holtz, Goodman & Woodward

[57] ABSTRACT

The digital signal values of adjacent picture points of pairs of points straddling the picture point currently being processed in every direction are compared in terms of only their more significant bits to determine which, if any, of the pairs involve a difference of value greater than a predetermined threshold. The determination that such a value difference is present is treated as the recognition of a picture contrast feature and causes, through operation of a read-only memory, the exclusion of such a picture point pair from the averaging process for producing a substitute value for the picture point currently under processing when the latter is found unusable by means of an error-detector. The resulting system for concealing errors detected in television picture avoids disturbing the outlines of picture features as other systems do which substitute averages of neighboring picture points for picture points found to be erroneous.

6 Claims, 3 Drawing Figures

METHOD AND APPARATUS FOR CONCEALING ERRORS IN A DIGITAL TELEVISION SIGNAL

This invention concerns a method and apparatus for substituting another digital signal for a digital television signal that has been found to be erroneous, the substituted signal being derived from digital signals relating to neighboring picture points.

Methods and systems for making it instantly possible, when an erroneous picture point signal is detected, to substitute the average value of two neighboring picture points on a line passing through the picture point represented by the erroneous signal are disclosed in two copending patent applications owned by the assignee of this application, namely Ser. No. 357,619, filed Mar. 12, 1982 and Ser. No. 366,936, filed Apr. 9, 1982, now U.S. Pat. No. 4,464,674, regarding each of which I am a joint applicant. The methods and systems there described proceed on the basis of the recognition that television pictures, so far as the brightness information is concerned, have a considerably redundant structure, and the value of neighboring picture points correspond more or less to the value of an unspoiled picture point. At edge transitions, however, for example where a jump from black to white, or vice versa, takes place in a television picture, the methods described in these prior applications are open to serious error, since neither a value representing white, nor a value representing black, will in general be substituted for the defective picture point signal, but rather a gray value.

THE INVENTION

It is an object of the present invention to make it possible quickly and effectively to determine whether a detected erroneous picture point signal lies at an edge between high and low brightness value and, if it does, to substitute a value derived from neighboring picture points which will not disturb the representation of that edge.

Briefly, the various pairs of picture points available for providing a derived value are examined for the presence of a steep change in brightness value and when a steep change is detected, picture points recognizing the picture structure thus revealed are used to provide a substituted value for the erroneous value. The same system of delay circuits delaying signals by one line, and in each case also making available several signals for each line progressively delayed by one picture point, that is described in the aforesaid copending applications, is utilized together with additional circuitry necessary for operation in accordance with the present invention.

The present invention has the advantage that the analysis of the picture content in the vicinity of a disturbed picture point signal excludes neighboring picture point signals showing large value differences from the process of deriving a new picture point value for substitution for the erroneous signal. This excludes a source of error to which the earlier systems were vulnerable.

There is also the advantage that existing circuit units can be modified in a simple way without considerable additional expense for the practice of the invention. Furthermore, by the provision of hysteresis in the comparison of neighboring picture point values straddling a disturbed picture point, certain deviations of the picture point values can be allowed.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figures 1, 3:
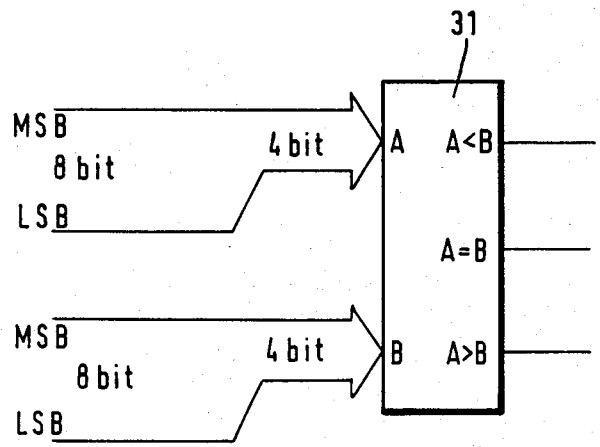
FIG. 1 is a diagram of picture points of a portion of a television picture where a horizontal black-white transition takes place.
FIG. 3 is a diagrammatic representation of a comparator system having hysteresis utilized in the circuit of FIG. 2.

Corresponding portions of five successive television lines designated n−2 to n+2 are shown in FIG. 1, each line consisting of a number of picture points forming part of the point raster of the television picture. Of the five lines the middle line n is intended to represent a line currently being reproduced, while the line n−1 is the line preceding it, the line n−2 the next but one preceding it, the line n+1 the line following the line n and the line n+2 the line following n+1. Seven picture points of each line are shown and the point symbols indicate that the line n−2, n−1 and n contain white picture points and the line n+1 and n+2 black picture points. A picture point of line n designated by a cross represents a picture point disturbed by drop-out during the reproduction from a magnetic tape in a digital recording and reproduction apparatus.

In accordance with the procedures described in the aforesaid prior applications, a new value is derived from the values of neighboring picture points around the disturbed picture point which is then substituted in place of the disturbed picture point. From the brightness jump or step running horizontally in FIG. 1 and providing a black-to-white transmission between lines n and n+1, carrying over the neighboring point values to provide a substitute value for the disturbed point would derive a medium gray value from the vertically neighboring picture points a and b, which would disturb the luminance structure of the black-to-white transition when substituted in place of the disturbed picture point.

According to the present invention an analysis is made of the picture content in the area surrounding the disturbed picture point x and on the basis of this analysis, as the result of the recognition of a larger luminance step or jump, an error processor is interposed for calculating the new picture point value. The error processor is so controlled by a control circuit that, for example, the picture points a and b are excluded from the average value calculation in the case of the situation illustrated in FIG. 1 and, for example, the picture points c and d are utilized for providing an average value.

Figure 2:
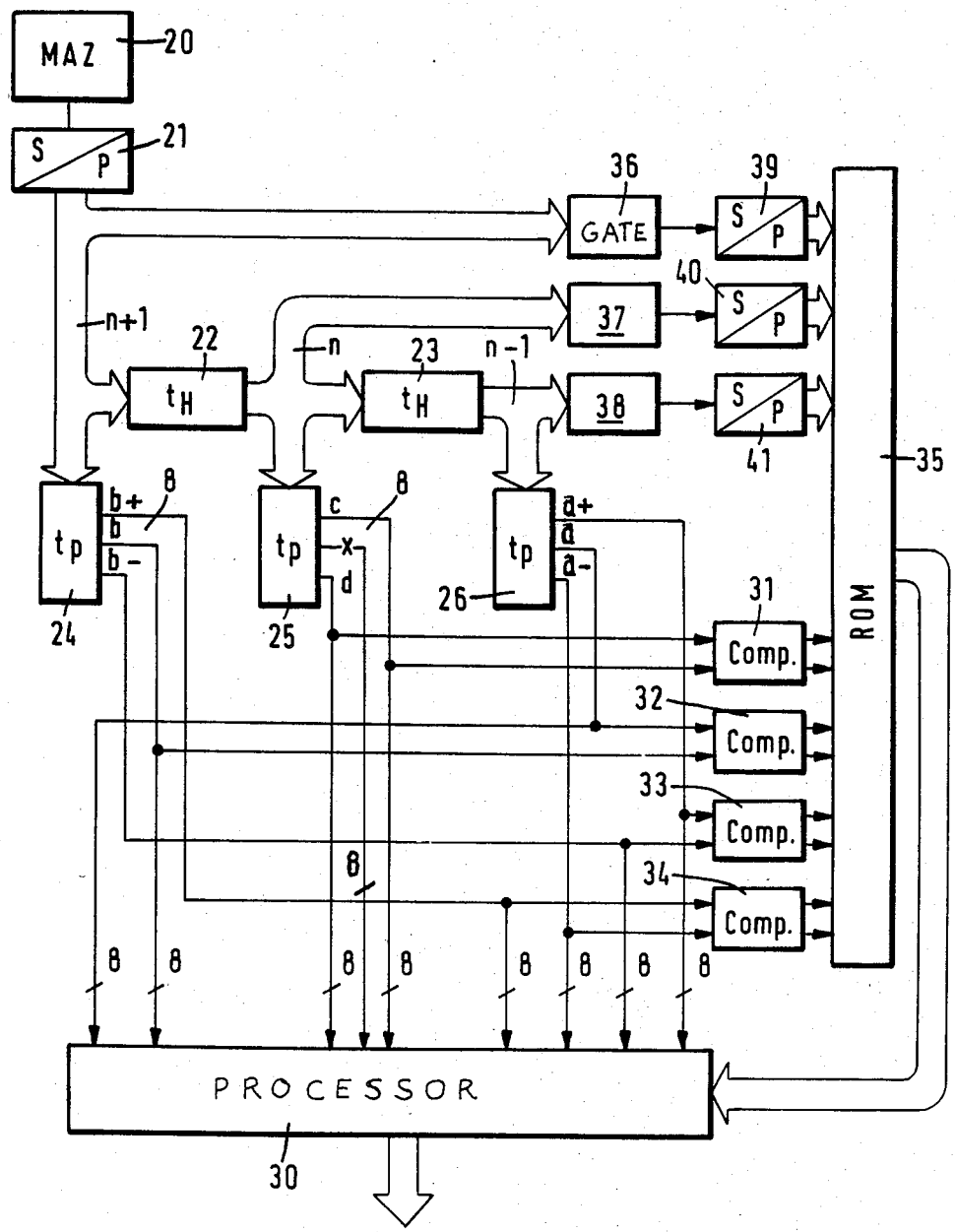
FIG. 2 is a block diagram of a circuit according to the invention.

As shown in FIG. 2, a series-to-parallel converter 21 is connected at the output of a magnetic tape apparatus 20 used for storing digitally-coded color television signals on a tape. The digital video signal at the output of the series-to-parallel converter 21 which appears in 8-bit parallel serial representation of the successive picture points is then supplied successively to two delay units 22 and 23 each of which delays the signal by the time period of one television line. The signal at the input of the delay circuit 22 represents the signal of the line n+1 in terms of the diagram of FIG. 1, the signal at the output of the delay unit 22 represents the currentlyway in the processor 30. For example, if averaging in a horizontal direction is preferred, the horizontal pair can be given first priority in the order of selection followed by one diagonal, the other diagonal and, last, the vertical pair. The ROM 35, not only serves to exclude from selection picture point pairs containing a disturbed picture point, but also, in cooperation with the processor 30, operates as control means for selecting the least differing picture point pair, and even if two or more pairs have the same difference or have differences below the threshold of the comparators 31–34, will determine the pair of which the average value will be used to substitute for the value of a disturbed picture point.

It should be further mentioned that whenever there is no disturbance present in the video signal, the picture point signals simply run through the circuit of FIG. 2 without any kind of manipulation like in the copending applications. Only when and if it is recognized that as the result of testing the very picture point signal that is currently being processed, an error or disturbance is present, is a particular address pattern applied by the gates 36, 37 and 38 to the ROM 35, which then responds, taking account of the values of the neighboring nonfaulty picture point pairs as analyzed by the comparators 31–34 exercises an appropriate control on the error processor 30 and causes a particular value to be computed from the neighboring picture points, drawing into account more or less neighboring picture points for this average value formation.

It should also be stressed that in the explanation of the invention in particular regard to the block circuit diagram of FIG. 2, no account has been taken with regard to the timing requirements of the circuit technology processing the signal, i.e. nothing has been said regarding a certain time sequence of the individual signals and their replacement by other signals. Propagation time differences as the result of different circuit treatment of disturbed and undisturbed signals have not been taken into account, but it should be understood that the conventional methods of timing circuits for processing digital signals and providing logic operations are usable in the circuits here referred to in essentially the same way as in other digital signal and logic circuits. It is well-known how to provide, either by the insertion of very small delays or by the use of clocking circuits, for avoiding malfunction of circuits because of timing problems.

Although the invention has been described with reference to a particular illustrative example it will be understood that modifications and variations are possible within the inventive concept.

A further advantage is performed of assigning different priorities to different picture point pairs with reference to their positions with respect to other undisturbed picture points.

I claim:

1. Method of concealing errors in a digital video signal comprising the steps of:
    making available simultaneously by a signal delay network the value of a digital signal representing a first picture point currently being reproduced and signals representing all the picture points immediately adjacent to said first picture point;
    subjecting said signal representing said first picture point to an error detecting test;
    at least in the event that said error detecting test detects the presence of error in said signal representing said first picture point, comparing the signal values representing the members of each and every pair adjacently straddling said first picture point, determining in each case whether the members of a pair of said signal values differ by more than a predetermined amount, and providing comparison result signals representative of said determinations;
    in the event that said error detecting test detects the presence of an error in said signal representing said first picture point, causing the exclusion from further processing regarding said first picture point of all signals representing picture point pairs found by said comparison and determination step to differ from each other by more than said predetermined amount and then causing the values of signals representative of at least one other pair of said picture points to be averaged together to produce an average value signal, and
    inserting said average value signal in an output digital video signal stream in place of said digital signal representing said first picture point.

2. Method as defined in claim 1 in which the step is also performed of assigning relative priorities to different picture point pairs with reference to their position with respect to said first picture point.

3. Method as defined in claim 1 in which said picture point pairs, the signals representing which are not excluded from processing regarding said first picture point, and for which pairs said comparing step had provided identical comparison results, are respectively selectable for forming an average value according to a predetermined priority scheme based on their position with respect to said first picture point.

4. Apparatus for concealing errors in a digital video signal comprising the steps of:
    means for detecting the presence of an error in any combination of digital signals representing a first picture point among said video signals;
    a network of delay circuits for simultaneously making available at respective outputs of said network, as each picture point signal successively becomes said first picture point and is, in its turn, being processed for error concealment, said first picture point signal being currently processed and also a multiplicity of other picture point signals representing all pairs of picture points bridgingly adjacent to said first picture point for contributing to the processing of said first picture point;
    means for comparing with each other the members of each said pair of said picture point signals simultaneously made available with said picture point signal of said first picture point and thereby determining in each comparison whether the members of the pair of picture point signals differ from each other by more than a predetermined amount of picture point brightness value;
    means for forming an average value in response to the values of the picture point signals constituting at least one selected pair of picture point signals;
    means for excluding picture point signals of picture point pairs found by said detecting means to contain at least one disturbed picture point from selection for averaging in said averaging means, and
    control means responsive to the detection of an error by said error-detecting means, in said video signal representing said first picture point, for selecting paired picture point signals, at least partly on the basis of minimizing intra-pair differences as detected by said comparing means, from said picture point signals not excluded by said excluding means, for averaging in said averaging means and for substituting the result of said averaging means for the video signal originally representing said first picture point.

5. Apparatus as defined in claim 4 in which said exclusion means is constituted by a read-only memory (35) having its address input connected with the outputs of said comparison and determination means and having its outputs connected for control of said averaging means.

6. Apparatus as defined in claim 4 in which said comparison and determining means has the said predetermined value fixed by the number of the more significant bits of the picture point video signals that are admitted to the input of said comparison means.

* * * * *